United States Patent
Yamamoto et al.

(10) Patent No.: US 10,038,913 B2
(45) Date of Patent: Jul. 31, 2018

(54) IMAGE PROCESSING APPARATUS, IMAGE PROCESSING METHOD, AND IMAGE PROCESSING PROGRAM

(71) Applicant: KABUSHIKI KAISHA TOSHIBA, Tokyo (JP)

(72) Inventors: Takuma Yamamoto, Kanagawa (JP); Nao Mishima, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 269 days.

(21) Appl. No.: 14/943,374

(22) Filed: Nov. 17, 2015

(65) Prior Publication Data
US 2016/0295232 A1    Oct. 6, 2016

(30) Foreign Application Priority Data
Mar. 30, 2015   (JP) ................................. 2015-070390

(51) Int. Cl.
*H04N 19/553*  (2014.01)
*H04N 19/513*  (2014.01)
*H04N 19/587*  (2014.01)

(52) U.S. Cl.
CPC ......... *H04N 19/521* (2014.11); *H04N 19/553* (2014.11); *H04N 19/587* (2014.11)

(58) Field of Classification Search
None
See application file for complete search history.

(56) References Cited

U.S. PATENT DOCUMENTS

| 4,238,772 | A | * | 12/1980 | von Gierke | H04N 5/14 348/629 |
| 4,488,245 | A | * | 12/1984 | Dalke | G01J 3/46 356/405 |
| 4,890,160 | A | * | 12/1989 | Thomas | H04N 5/145 348/429.1 |
| 5,006,929 | A | * | 4/1991 | Barbero | H04N 19/51 375/240.02 |
| 6,219,436 | B1 | * | 4/2001 | De Haan | G06T 7/20 356/27 |

(Continued)

FOREIGN PATENT DOCUMENTS

| EP | 2224738 A1 | * | 9/2010 | ........... H04N 7/0132 |
| EP | 2383992 A2 | * | 11/2011 | ............ H05N 5/145 |

(Continued)

*Primary Examiner* — Jay Patel
*Assistant Examiner* — Shadan E Haghani
(74) *Attorney, Agent, or Firm* — Nixon & Vanderhye, P.C.

(57) ABSTRACT

One embodiment discloses an image processing apparatus which generates an interpolation frame from consecutive first and second frames, including: a motion estimation section which assigns, to the interpolation frame, motion vectors from the first frame to the second frame; a first degree-of-difference calculation section which extracts calculates a first degree of difference in terms of pixel values; a second degree-of-difference calculation section which calculates a second degree of difference in terms of vectors; and an interpolation frame generation section which generates the interpolation frame by determining a motion vector that should be assigned to a pixel of attention on the basis of combined weights obtained by combining the first degrees of difference and the second degrees of difference, respectively.

14 Claims, 5 Drawing Sheets

(56) References Cited

U.S. PATENT DOCUMENTS

| | | | |
|---|---|---|---|
| 6,487,313 B1 * | 11/2002 | De Haan | H04N 5/145 348/416.1 |
| 7,519,230 B2 | 4/2009 | Wittebrood et al. | |
| 8,320,458 B2 | 11/2012 | Sato | |
| 8,335,258 B2 | 12/2012 | Okumura et al. | |
| 2008/0240240 A1 * | 10/2008 | Kodama | H04N 19/56 375/240.14 |
| 2009/0231314 A1 * | 9/2009 | Hanaoka | G09G 3/2096 345/208 |
| 2010/0177974 A1 * | 7/2010 | Chen | H04N 5/145 382/236 |
| 2011/0116547 A1 * | 5/2011 | Chen | G06T 3/40 375/240.16 |
| 2011/0169818 A1 * | 7/2011 | Pan | H04N 13/0011 345/419 |
| 2011/0188579 A1 * | 8/2011 | Lin | H04N 19/56 375/240.16 |
| 2011/0211111 A1 | 9/2011 | Mishima et al. | |
| 2012/0169844 A1 | 7/2012 | Mishima et al. | |

FOREIGN PATENT DOCUMENTS

| | | | |
|---|---|---|---|
| JP | 2006-513661 | 4/2006 | |
| JP | 2007-074593 | 3/2007 | |
| JP | 2010-056629 | 3/2010 | |
| JP | 2010-141437 | 6/2010 | |
| JP | 2011-182193 | 9/2011 | |
| JP | 4892113 | 3/2012 | |
| WO | WO 2007105433 A1 * | 9/2007 | G09G 3/2096 |

* cited by examiner

IMAGE PROCESSING APPARATUS, IMAGE PROCESSING METHOD, AND IMAGE PROCESSING PROGRAM

CROSS-REFERENCE TO RELATED APPLICATION(S)

This application claims priority from Japanese Patent Application No. 2015-070390 filed on Mar. 30, 2015, the entire contents of which are incorporated herein by reference.

FIELD

An embodiment described herein generally relates to an image processing apparatus, an image processing method, and an image processing program.

BACKGROUND

An interpolation frame generation is performed to increase the number of frames per unit time by interpolating interpolation frames between frames of a moving image. Image display apparatuses (liquid crystal displays, electroluminescence displays, etc.) capable of performing an interpolation frame generation can display a moving image smoothly.

In an interpolation frame generation, if a motion vector is estimated for each pixel or block on the basis of correlation between the pixel values of corresponding pixels or blocks belonging to two consecutive frames (hereinafter referred to as input frames), an interpolation frame is generated using such motion vectors.

If an object in an image is moved between an input frame (first input frame) and an input frame (second input frame) following it, a new background region (hereinafter referred to as an "occlusion region") occurs in the second input frame. No motion vectors can be determined for an occlusion region on the basis of correlation between pixel values because it has no corresponding region in the first input frame. It is therefore necessary to determine pixel values of each interpolation frame by determining motion vectors for an occlusion region properly.

BRIEF DESCRIPTION OF DRAWINGS

A general architecture that implements the various features of the present invention will now be described with reference to the drawings. The drawings and the associated descriptions are provided to illustrate embodiments and not to limit the scope of the present invention.

DETAILED DESCRIPTION

An embodiment will be hereinafter described with reference to the drawings.

Figure 1:
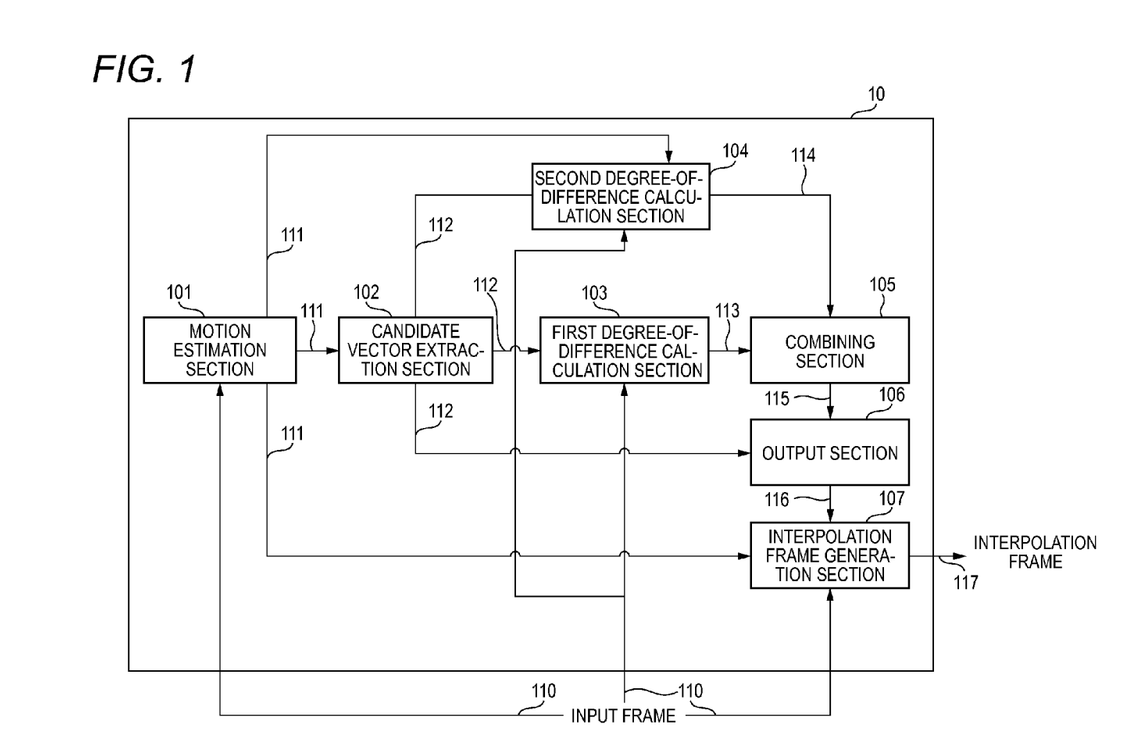
FIG. 1 is a block diagram of an image processing apparatus according to an embodiment.

FIG. 1 is a block diagram of an image processing apparatus 10 according to the embodiment. The image processing apparatus 10 is equipped with a motion estimation section 101, a candidate vector extraction section 102, a first degree-of-difference calculation section 103, a second degree-of-difference calculation section 104, a combining section 105, an output section 106, and an interpolation frame generation section 107.

The motion estimation section 101 receives input frames 110 and estimates motion vectors 111 in interpolation frames. The candidate vector extraction section 102 receives the motion vectors 111 that are output from the motion estimation section 101, and calculates candidate vectors 112. The first degree-of-difference calculation section 103 receives the input frames 110 and the calculated candidate vectors 112 and calculates first degrees of difference 113. The second degree-of-difference calculation section 104 receives the input frames 110, the motion vectors 111, and the calculated candidate vectors 112 and calculates second degrees of difference 114. The combining section 105 combines each first degree of difference 113 calculated by the first degree-of-difference calculation section 103 and the corresponding second degree of difference 114 calculated by the second degree-of-difference calculation section 104, and outputs a combined weight 115. The output section 106 receives the candidate vectors 112 and the combined weights 115 and outputs motion vectors 116 for an occlusion region. The interpolation frame generation section 107 generates an interpolation frame 117.

Figure 2:
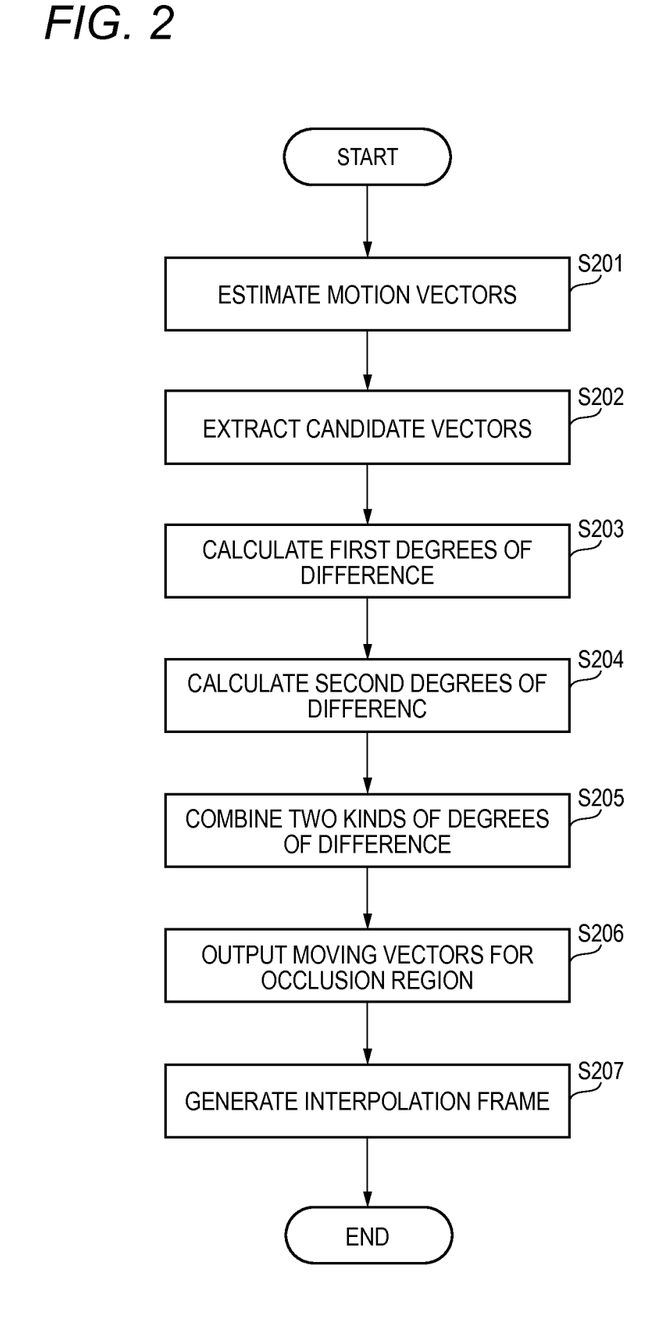
FIG. 2 is a flowchart showing how the image processing apparatus according to the embodiment operates.

FIG. 2 is a flowchart showing how the image processing apparatus 10 operates. How the image processing apparatus 10 operates will be described below with reference to FIGS. 1 and 2.

At step S201, the motion estimation section 101 acquires two consecutive frames, that is, a first input frame and a second input frame, and generates and outputs motion vectors 111 of an interpolation frame. It is assumed that the first and second input frames 110 are frames occurring at times t and t+1, respectively, and they are denoted by symbols $I_t$ and $I_{t+1}$, respectively.

First, the motion estimation section 101 determines motion vectors from $I_t$ to $I_{t+1}$. A block matching method, a gradient method, or the like may be used for detection of motion vectors.

Each motion vector at a time of an interpolation frame to be generated is obtained by translating a corresponding motion vector from $I_t$ to $I_{t+1}$. Let $u_t(x)$ represent a motion vector from $I_t$ to $I_{t+1}$ at a position represented by a position vector x in frame $I_t$. Then a motion vector $u_{t+\alpha}$ at time $t+\alpha$ ($0<\alpha<1$) of the interpolation frame can be calculated according to Equation (1):

$$u_{t+\alpha}(x+\alpha u_t(x))=u_t(x) \tag{1}$$

If no motion vector can be determined for a pixel in the interpolation frame, a value indicating indefiniteness (hereinafter referred to as an indefinite value) is substituted for a motion vector. A region consisting of pixels for each of whose motion vectors the indefinite value is substituted is an occlusion region.

Figure 3A:
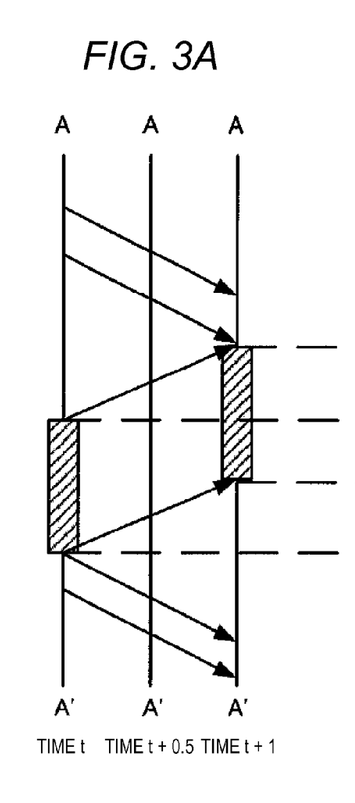
FIGS. 3A and 3B illustrate an occlusion region.
Figure 3B:
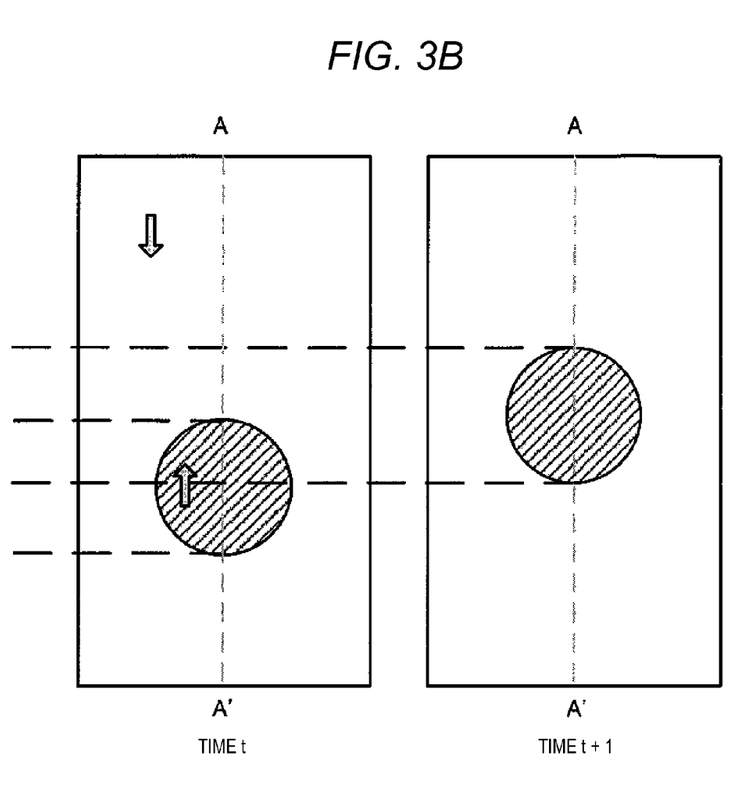
Figure 4:
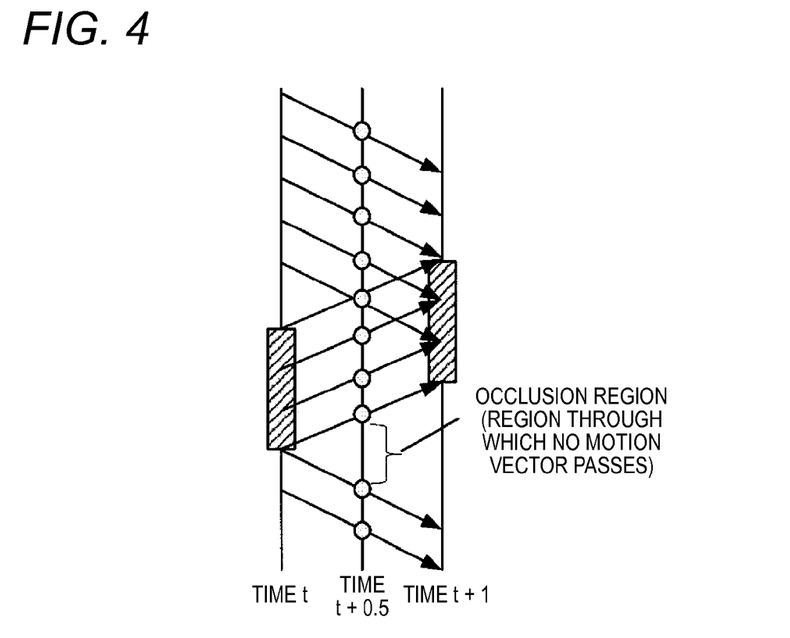
FIG. 4 illustrates the occlusion region.

The occlusion region will be described below with reference to FIGS. 3A and 3B and FIG. 4. To simplify the description, an object that is moving on a one-dimensional line is assumed as an example. Also assume that as shown in FIG. 3B a circular object is moving upward in the paper surface and the background is moving downward in the paper surface from time t to t+1. In the example of FIGS. 3A and 3B and FIG. 4, the time of an interpolation frame is assumed to be t+0.5. FIG. 3A shows positions of the object on line A-A' at times t, t+0.5, and t+1.

FIG. 4 shows a state that a motion vector to frame $I_{t+1}$ has been determined for every position vector x in frame $I_t$ (time t). In this state, if a motion vector $u_{t+0.5}$ at the time of the interpolation frame is calculated by translating each motion vector to a position corresponding to time t+0.5, there occurs a region through which no motion vectors pass. Motion vectors for this region are indefinite. This region is a background region that has newly occurred as a result of the movement of the object and is called an occlusion region.

After the generation of the motion vectors 111 of the interpolation frame, at step S202 the candidate vector extraction section 102 extracts candidate vectors. The candidate vector extraction section 102 receives the motion vectors 111 of the interpolation frame, and extracts plural motion vectors that have been determined for respective pixels around the occlusion region. The plural motion vectors extracted by the candidate vector extraction section 102 are called candidate vectors 112.

More specifically, candidate vectors 112 are extracted in the following manner. As mentioned above, the motion estimation section 101 assigns the indefinite value to the pixels in the occlusion region. The candidate vector extraction section 102 employs, as a pixel of attention, the pixel to which the indefinite value is assigned. Then the candidate vector extraction section 102 extracts, as candidate vectors, motion vectors of pixels that are located in, for example, a rectangle centered by the pixel of attention and having a prescribed size and are given a motion vector rather than the indefinite value. The region around the pixel of attention is not limited to a rectangle and may be a circle or an ellipse. It may have any shape as long as it is close to the pixel of attention.

At step S203, the first degree-of-difference calculation section 103 assigns each of the plural candidate vectors to the pixel of attention and calculates a first degree of difference between the pixel value of a pixel pointed by the candidate vector as assigned to the pixel of attention and the pixel value of a pixel that was pointed originally by the candidate vector. More specifically, the first degree-of-difference calculation section 103 calculates, for each candidate vector, a first degree of difference 113 between the pixel value of a pixel that was pointed originally by the candidate vector $u_{t+\alpha}(y)$ from the start point (indicated by a position vector y) and the pixel value of a pixel pointed by the candidate vector $u_{t+\alpha}(y)$ from the position of the pixel of attention (indicated by a position vector x). The first degree-of-difference $d_I$ can be calculated according to the following Equation (2). The taking of an absolute value in Equation (2) may be replaced by squaring.

$$d_I(x,y)=|I_{t+1}(x+(1-\alpha)u_{t+\alpha}(y))-I_{t+1}(y+(1-\alpha)u_{t+\alpha}(y))| \quad (2)$$

Figure 5:
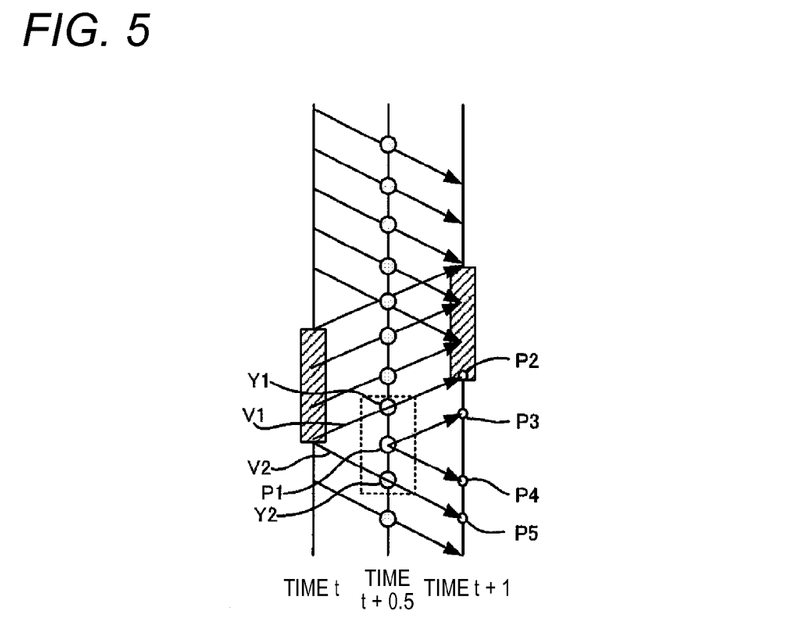
FIG. 5 illustrates processing performed by the image processing apparatus according to the embodiment.

The pieces of processing performed by the candidate vector extraction section 102 and the first degree-of-difference calculation section 103 will be described below with reference to FIG. 5. The candidate vector extraction section 102 selects already determined motion vectors V1 and V2 from motion vectors of a region (indicated by a broken line in FIG. 5) around a pixel of attention P1. The first degree-of-difference calculation section 103 assigns the candidate vector V1 to the pixel of attention P1 and calculates the degree of difference between the pixel value of a pixel P3 that is pointed by the candidate vector V1 from the pixel of attention P1 and that of a pixel P2 that is pointed by the candidate vector V1 from the start point Y1 of the candidate vector V1. Likewise, the first degree-of-difference calculation section 103 assigns the candidate vector V2 to the pixel of attention P1 and calculates the degree of difference between the pixel value of a pixel P4 that is pointed by the candidate vector V2 from the pixel of attention P1 and that of a pixel P5 that is pointed by the candidate vector V2 from the start point Y2 of the candidate vector V2.

At step S204, the second degree-of-difference calculation section 104 calculates second degrees of difference. More specifically, first, the second degree-of-difference calculation section 104 calculates major background vectors from the motion vectors 111 of the interpolation frame.

Usually, a moving image contains plural subjects which have different motion vectors. The second degree-of-difference calculation section 104 calculates, as major background vectors, vectors indicating representative motions of respective subjects. To calculate major background vectors, the second degree-of-difference calculation section 104 employs motion vectors that have already been determined for pixels in a region that is wider than the region around the pixel of attention that was employed by the candidate vector extraction section 102 to extract the candidate vectors from the already determined motion vectors.

For example, a method described in JP-4892113-B may be used for calculating each major background vector. In the method of JP-4892113-B, a vector calculated for a block that should be a deepest one is detected as a major background vector. However, the method for calculating each major background vector is not limited to it. Another method may be used in which motion vectors of the interpolation frame are clustered into two classes and an average vector or a median vector of a cluster having a larger area is employed as a major background vector.

Then the second degree-of-difference calculation section 104 calculates a second degree of difference 114 between each of the plural candidate vectors and the major background vector. The second degree of difference 114 can be calculated according to Equation (3), where $u_B$ is the major background vector:

$$d_V(y)=\|u_{t+\alpha}(y)-u_B\| \quad (3)$$

Equation (3) is to calculate the norm of the difference between the candidate vector $u_{t+\alpha}(y)$ and the major background vector $u_B$. The norm may be the L1 norm or the L2 norm. The method for calculating a second degree of difference 114 is not limited to the above method. Another method may be used in which a norm as shown in the right-hand side of Equation (3) is calculated for every candidate vector and a second degree of difference 114 is calculated according to Equation (4), where m is a minimum value of the calculated norms. Instead of taking an absolute value as in Equation (4), it may be squared.

$$d_V(y)=|\|u_{t+\alpha}(y)-u_B\|-m| \quad (4)$$

At step S205, the combining section 105 calculates combined weights 115 by combining the first degrees of difference 113 and the second degrees of differences 114, respectively. For example, each combined weight 115 may be calculated according to Equation (5):

$$d(x,y)=d_I(x,y)+d_V(y) \quad (5)$$

Alternatively, each combined weight 115 may be calculated according to Equation (6) by setting weights $w_I$ and $w_V$ for the first degree of difference 113 and the second degree of difference 114, respectively. The weights $w_I$ and $w_V$ are set by a designer in advance.

$$d(x,y)=w_I d_I(x,y)+w_V d_V(y) \quad (6)$$

As a further alternative, each combined weight 115 may be calculated according to Equation (7) using a Gaussian function:

$$d'(x, y) = \exp\left(-\frac{d_I^2(x, y)}{2\sigma_I^2}\right)\exp\left(-\frac{d_V^2(y)}{2\sigma_V^2}\right) \quad (7)$$

In Equation (7), $\sigma_I$ and $\sigma_V$ are parameters that correspond to weights of weighted addition and are set by a designer in advance. Although the Gaussian function is used in Equation (7), the embodiment is not limited to such a case; any monotonously decreasing function may be employed to calculate each combined weight 115.

At step S206, the output section 106 generates and outputs motion vectors 116 for the occlusion region. Each motion vector 116 for the occlusion region is selected according to the corresponding combined weight 115. The combined weight 115 increases monotonously with respect to each of $d_I(x, y)$ and $d_V(y)$ if it is calculated according to Equation (5) or (6), and decreases monotonously with respect to each of $d_I(x, y)$ and $d_V(y)$ if it is calculated according to Equation (7). Therefore, the method for selecting each motion vector 116 for the occlusion region depends on how to calculate a combined weight 115.

For example, each motion vector 116 for the occlusion region may be determined by selecting a candidate vector that minimizes the combined weight $d(x, y)$ calculated according to Equation (5) or (6) from the candidate vectors extracted for the pixel of attention. Alternatively, each motion vector 116 for the occlusion region may be determined by selecting a candidate vector that maximizes the combined weight $d'(x, y)$ calculated according to Equation (7). As a further alternative, a vector that is obtained by performing weighted addition on all candidate vectors extracted for the pixel of attention using, as its weights, combined weights $d'(x, y)$ calculated according to Equation (7) may be employed as each motion vector 116 for the occlusion region. In this case, each motion vector $u_{t+\alpha}(x)$ for the occlusion region may be calculated according to Equation (8):

$$u_{t+\alpha}(x) = \frac{1}{Z}\sum_{y \in C} d'(x, y)u_{t+\alpha}(y) \quad (8)$$

In Equation (9), C is a set of position vectors of the start points of the candidate vectors and Z is the sum of the combined weights and is given by Equation (9):

$$Z = \sum_{y \in C} d'(x, y) \quad (9)$$

Weighted addition may be performed using combined weights $d(x, y)$ calculated according to Equation (5) or (6). For example, a vector that is obtained by performing weighted addition on all the candidate vectors extracted for the pixel of attention using values $1/d(x, y)$ as its weights may be employed as each motion vector 116 for the occlusion region.

At step S207, the interpolation frame generation section 107 generates and outputs an interpolation frame 117. A pixel value $I_{t+\alpha}(x)$ of each of pixels, outside the occlusion region, of the interpolation frame may be calculated according to, for example, the following Equation (10):

$$I_{t+\alpha}(x)=(1-\alpha)I_t(x-\alpha u_{t+\alpha}(x))+\alpha I_{t+1}(x+(1-\alpha)u_{t+\alpha}(x)) \quad (10)$$

A pixel value $I_{t+\alpha}(x)$ of each of pixels, in the occlusion region, of the interpolation frame may be calculated according to, for example, the following Equation (11):

$$I_{t+\alpha}(x)=I_{t+1}(x+(1-\alpha)u_{t+\alpha}(x)) \quad (11)$$

In the above-described manner, the image processing apparatus 10 can generate the interpolation frame 117 at time t+α.

Figure 6:
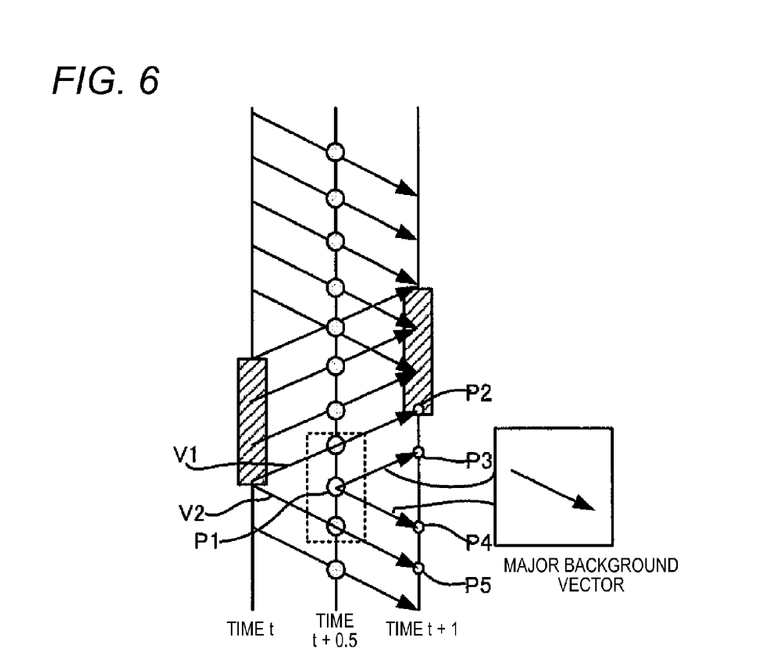
FIG. 6 illustrates an advantage of the image processing apparatus according to the embodiment.

An advantage of the image processing apparatus 10 according to the embodiment will be described below with reference to FIGS. 5 and 6. Each of FIGS. 5 and 6 shows positions on the line A-A' in FIG. 3B. A description will be made of how a motion vector of a pixel of attention P1 is calculated. Candidate vectors are assumed to be V1 and V2. Symbol P2 denotes a pixel of a circular object, and P1, P3, P4, and P5 denote background pixels.

In this case, the first degree of difference of the candidate vector V1 is the degree of difference between the pixel values of the pixels P2 and P3 and the first degree of difference of the candidate vector V2 is the degree of difference between the pixel values of the pixels P4 and P5. If background pixel values are uniform, the first degree of difference of the candidate vector V2 is smaller than that of the candidate vector V1. If selection is made between the candidate vectors V1 and V2 only on the basis of their first degrees of differences (i.e., their second degrees of difference are not taken into consideration), the candidate vector V2 having the smaller first degree of difference is selected. However, if the background image structure is complex or there exists influence of noise, the first degree of difference of the candidate vector V2 may be larger than that of the candidate vector V1. For this reason, the candidate vector V1 may be selected erroneously if selection is made only on the basis of the first degrees of differences.

In contrast, by taking into consideration the second degrees of difference in addition to the first degrees of differences (see FIG. 6), the image processing apparatus 10 is made less prone to influence of noise etc. and can hence select the correct candidate vector V2.

As such, by taking into consideration second degrees of difference in addition to first degrees of differences, the image processing apparatus 10 according to the embodiment can determine motion vectors and pixel values for an occlusion region in the manner that is robust to a background image structure and influence of noise, and hence can generate high-quality interpolation frames.

Figure 7:
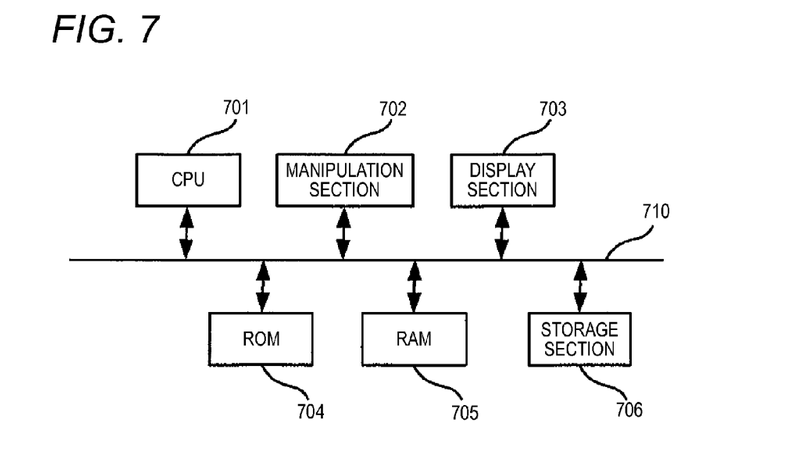
FIG. 7 shows the hardware configuration of the image processing apparatus according to the embodiment.

Next, the hardware configuration of the image processing apparatus 10 will be described with reference to FIG. 7. The image processing apparatus 10 is equipped with a CPU (central processing unit) 704, a manipulation section 702, a display section 703, a ROM (read-only memory) 704, a RAM (random access memory) 705, and a storage section 706 which are connected to each other by a bus 710.

The CPU 701 performs various kinds of processing in cooperation with various control programs previously stored in the ROM 704 using a prescribed area of the RAM 705 as a working area and thereby supervises the operations of the individual sections of the image processing apparatus 10. Cooperating with programs previously stored in the ROM 704, the CPU 701 realizes the above-described functions of the motion estimation section 101, the candidate vector extraction section 102, the first degree-of-difference calculation section 103, the second degree-of-difference calculation section 104, the combining section 105, the output section 106, and the interpolation frame generation section 107.

The manipulation section 702 converts an image into an electrical signal and outputs the latter to the CPU 701. The ROM 704 stores, in an unrewritable manner, programs, various kinds of setting information, etc. for the control of the image processing apparatus 10. The RAM 705, which is a storage means such as an SDRAM, functions as a working area of the CPU 701 and plays a role of a buffer etc. The storage section 706, which has a magnetically or optically recordable storage medium, stores data such as an image signal that is acquired via the manipulation section 702 and an image signal that is input externally via a communication section (not shown), an interface, or the like.

The configuration of the image processing apparatus 10 is not limited to the above. For example, part or all of the above-described functions of the individual sections may be implemented by dedicated hardware circuits (e.g., semiconductor integrated circuits). The functions of the individual sections of the image processing apparatus 10 may be implemented by plural processor circuits.

Although the embodiment has been described above, it is an example and should not be construed as restricting the scope of the invention. This novel embodiment may be practiced in various other forms, and part of it may be omitted, replaced by other elements, or changed in various manners without departing from the spirit and scope of the invention. Such modifications will fall within the scope of the invention as claimed and its equivalents.

According to an aspect of the present invention, there is provided an image processing apparatus which generates an interpolation frame to be interpolated between a first frame and a second frame that is displayed at a different time than the first frame, including:
   a motion estimation section which assigns, to the interpolation frame, motion vectors from the first frame to the second frame;
   a first degree-of-difference calculation section which extracts, as a pixel of attention, a pixel that has been assigned no motion vector by the motion estimation section, and calculates a first degree of difference between a pixel value of a pixel pointed originally by each of candidate vectors already assigned to respective pixels existing in a first region around the pixel of attention and a pixel value of a pixel pointed by the candidate pixel as assigned to the pixel of attention;
   a second degree-of-difference calculation section which calculates a second degree of difference on the basis of each of the candidate vectors and a vector that is calculated from vectors already assigned to pixels existing in a second region that is wider than the first region; and
   an interpolation frame generation section which generates the interpolation frame by determining a motion vector that should be assigned to the pixel of attention on the basis of combined weights obtained by combining the first degrees of difference and the second degrees of difference, respectively.

According to another aspect of the present invention, there is provided an image processing apparatus which generates an interpolation frame to be interpolated between a first frame and a second frame that is displayed at a different time than the first frame, including:
   a motion estimation section which assigns, to the interpolation frame, motion vectors from the first frame to the second frame;
   a first degree-of-difference calculation section which extracts, as a pixel of attention, a pixel that has been assigned no motion vector by the motion estimation section, and calculates a first degree of difference between a pixel value of a pixel pointed originally by each of candidate vectors already assigned to respective pixels existing in a first region around the pixel of attention and a pixel value of a pixel pointed by the candidate pixel as assigned to the pixel of attention;
   a second degree-of-difference calculation section which calculates a second degree of difference on the basis of each of the candidate vectors and a major background vector representing a motion of a major background region; and
   an interpolation frame generation section which generates the interpolation frame by determining a motion vector that should be assigned to the pixel of attention on the basis of combined weights obtained by combining the first degrees of difference and the second degrees of difference, respectively.

According to still another aspect of the present invention, there is provided an image processing apparatus which generates motion vectors of an interpolation frame to be interpolated between a first frame and a second frame that is displayed at a different time than the first frame, including:
   a motion estimation section which assigns, to the interpolation frame, motion vectors from the first frame to the second frame;
   a first degree-of-difference calculation section which extracts, as a pixel of attention, a pixel that has been assigned no motion vector by the motion estimation section, and calculates a first degree of difference between a pixel value of a pixel pointed originally by each of candidate vectors already assigned to respective pixels existing in a first region around the pixel of attention and a pixel value of a pixel pointed by the candidate pixel as assigned to the pixel of attention;
   a second degree-of-difference calculation section which calculates a second degree of difference on the basis of each of the candidate vectors and a vector that is calculated from vectors already assigned to pixels existing in a second region that is wider than the first region; and
   an output section which outputs a motion vector that should be assigned to the pixel of attention on the basis of combined weights obtained by combining the first degrees of difference and the second degrees of difference, respectively.

According to still another aspect of the present invention, there is provided an image processing method for generating an interpolation frame to be interpolated between a first frame and a second frame that is displayed at a different time than the first frame, including:
   assigning, to the interpolation frame, motion vectors from the first frame to the second frame;
   extracting, as a pixel of attention, a pixel that has been assigned no motion vector by the assigning step, and calculating a first degree of difference between a pixel value of a pixel pointed originally by each of candidate vectors already assigned to respective pixels existing in a first region around the pixel of attention and a pixel value of a pixel pointed by the candidate pixel as assigned to the pixel of attention;
   calculating a second degree of difference on the basis of each of the candidate vectors and a vector that is calculated from vectors already assigned to pixels existing in a second region that is wider than the first region; and generating the interpolation frame by determining a motion vector that should be assigned to the pixel of attention on the basis of combined weights obtained by combining the first degrees of difference and the second degrees of difference, respectively.

According to still another aspect of the present invention, there is provided an image processing program for generating an interpolation frame to be interpolated between a first frame and a second frame that is displayed at a different time than the first frame, the image processing program causing the image processing apparatus to execute:

assigning, to the interpolation frame, motion vectors from the first frame to the second frame;

extracting, as a pixel of attention, a pixel that has been assigned no motion vector by the assigning step, and calculating a first degree of difference between a pixel value of a pixel pointed originally by each of candidate vectors already assigned to respective pixels existing in a first region around the pixel of attention and a pixel value of a pixel pointed by the candidate pixel as assigned to the pixel of attention;

calculating a second degree of difference on the basis of each of the candidate vectors and a vector that is calculated from vectors already assigned to pixels existing in a second region that is wider than the first region; and generating the interpolation frame by determining a motion vector that should be assigned to the pixel of attention on the basis of combined weights obtained by combining the first degrees of difference and the second degrees of difference, respectively.

The invention claimed is:

1. An image processing apparatus, comprising processing circuitry configured to at least:

assign motion vectors from a first frame to a second frame to pixels of an interpolation frame, the second frame to be displayed at a different time than the first frame, the interpolation frame to be interpolated between the first frame and the second frame;

extract, as a pixel of attention, a pixel in the interpolation frame to which no motion vector is assigned extract, as candidate motion vectors for the pixel of attention, motion vectors assigned to respective pixels in a first region of the interpolation frame around the pixel of attention;

calculate first degrees of difference based on a difference, for each respective candidate motion vector, between a pixel value of a pixel in the second frame to which the respective candidate motion vector points and a pixel value of a pixel in the second frame to which the respective candidate motion vector points when the respective candidate motion vector is assigned to the pixel of attention;

calculate second degrees of difference based on each of the candidate motion vectors and a motion vector calculated from motion vectors assigned to pixels in a second region of the interpolation frame that is wider than the first region; and output a motion vector to be assigned to the pixel of attention based on combined weights obtained by combining the first degrees of difference and the second degrees of difference, respectively.

2. The image processing apparatus of claim 1, wherein the processing circuitry is configured to generate the interpolation frame based on the output motion vector or pixel values for the pixel of attention.

3. The image processing apparatus of claim 2, wherein the processing circuitry is configured to calculate the combined weights by combining the first degrees of difference and the second degrees of difference, respectively; and output vectors by performing weighted addition on the candidate motion vectors using the combined weights, and generate the interpolation frame based on the assigned motion vectors, the output vectors, and pixel values of the first frame and the second frame.

4. The image processing apparatus of claim 3, wherein the processing circuitry is configured to calculate, from the first degrees of difference, a first degree of reliability that increases as first degree of difference decreases, calculate, from the second degrees of difference, a second degree of reliability that increases as second degree of difference decreases, and calculate the combined weights based on a product of the first degree of reliability and the second degree of reliability.

5. The image processing apparatus of claim 3, wherein the processing circuitry is configured to calculate the combined weights based on weighted addition involving the first degrees of difference and the second degrees of difference.

6. The image processing apparatus of claim 3, wherein the processing circuitry is configured to select a candidate motion vector that produces a largest combined weight.

7. The image processing apparatus of claim 3, wherein the processing circuitry is configured to select a candidate motion vector that produces a smallest combined weight.

8. The image processing apparatus of claim 1, wherein the processing circuitry is configured to calculate the second degrees of difference based on each of the candidate motion vectors and a major background vector representing a motion of a major background region.

9. The image processing apparatus of claim 8, wherein the major background vector is a moving vector of a subject associated with largest depth values.

10. The image processing apparatus of claim 1, wherein the processing circuitry comprises a central processing unit (CPU) configured to execute an image processing program.

11. The image processing apparatus of claim 1, wherein the processing circuitry comprises one or more dedicated hardware circuits.

12. The image processing apparatus of claim 1, wherein the processing circuitry comprises one or more processors.

13. An image processing method, comprising:

assigning motion vectors from a first frame to a second frame to pixels of an interpolation frame, the second frame to be displayed at a different time than the first frame, the interpolation frame to be interpolated between the first frame and the second frame;

extracting, as a pixel of attention, a pixel in the interpolation frame to which no motion vector is assigned;

extracting, as candidate motion vectors for the pixel of attention, motion vectors assigned to respective pixels in a first region of the interpolation frame around the pixel of attention;

calculating first degrees of difference based on a difference, for each respective candidate motion vector, between a pixel value of a pixel in the second frame to which the respective candidate motion vector points and a pixel value of a pixel in the second frame to which the respective candidate motion vector points when the respective candidate motion vector is assigned to the pixel of attention;

calculating second degrees of difference based on each of the candidate motion vectors and a vector calculated from motion vectors assigned to pixels in a second region of the interpolation frame that is wider than the first region; and outputting a motion vector to be assigned to the pixel of attention based on combined weights obtained by combining the first degrees of difference and the second degrees of difference, respectively.

14. A computer readable storage medium storing an image processing program that, when executed by processing circuitry of an image processing apparatus, causes the image processing apparatus to perform at least:

assigning motion vectors from a first frame to a second frame to pixels of an interpolation frame, the second frame to be displayed at a different time than the first frame, the interpolation frame to be interpolated between the first frame and the second frame;

extracting, as a pixel of attention, a pixel in the interpolation frame to which no motion vector is assigned;

extracting, as candidate motion vectors for the pixel of attention, motion vectors assigned to respective pixels in a first region of the interpolation frame around the pixel of attention;

calculating first degrees of difference based on a difference, for each respective candidate motion vector, between a pixel value of a pixel in the second frame to which the respective candidate motion vector points and a pixel value of a pixel in the second frame to which the respective candidate motion vector points when the respective candidate motion vector is assigned to the pixel of attention;

calculating second degrees of difference based on each of the candidate motion vectors and a vector calculated from motion vectors assigned to pixels existing in a second region of the interpolation frame that is wider than the first region; and outputting a motion vector to be assigned to the pixel of attention based on combined weights obtained by combining the first degrees of difference and the second degrees of difference, respectively.

* * * * *